3,452,646
VALVE AND SPRING RETAINER
Malcolm K. Abbott and Charlie N. French, South Bend, Ind., assignors to The Bendix Corporation, a corporation of Delaware
Filed Dec. 29, 1966, Ser. No. 605,697
Int. Cl. F15b 9/10, 11/08; F01b 19/00
U.S. Cl. 91—376    6 Claims

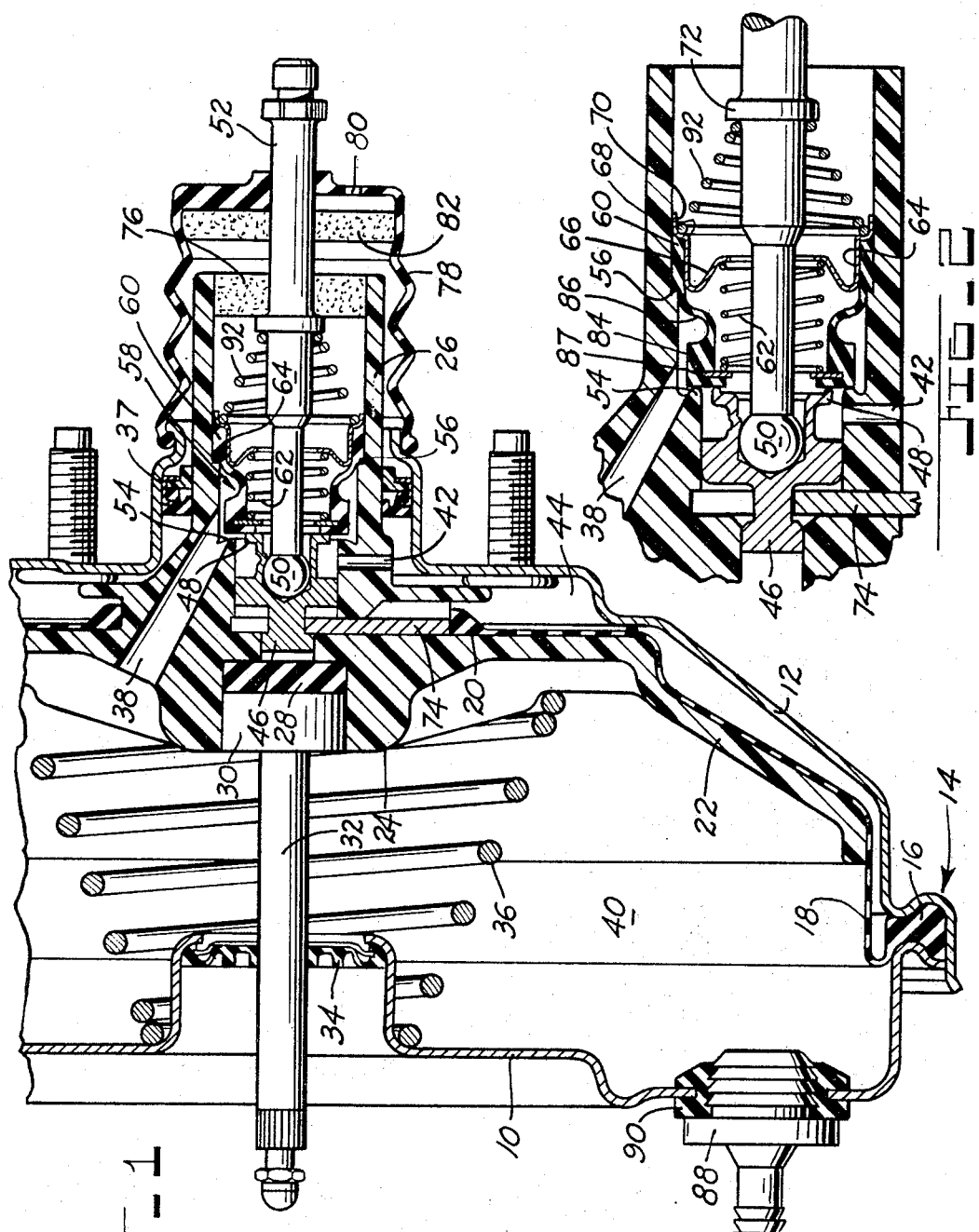

ABSTRACT OF THE DISCLOSURE

A valve and spring retainer for a flexible poppet valve that provides mounting means for a valve return spring and in addition a valve follow-up spring.

Summary

In present day servomotors it has been deemed necessary to provide two retainers for a flexible poppet valve that mounts first a valve mounting flange and in addition provides bearing means for a return spring and secondly to provide an additional member to mount a valve follow-up spring between a valve flange of the flexible poppet and surrounding structure.

This invention is concerned with a means to eliminate the two part assembly of prior art valve and spring retainers for poppet valves.

Drawing description

FIGURE 1 is a cross sectional view of a servomotor employing a valve and spring retainer in accordance with the principles of this invention; and FIGURE 2 is an enlarged cross sectional view of the poppet valve and spring retainer in accordance with the principles of this invention as applied in the servomotor of FIGURE 1.

Detailed description

With more particular regard to FIGURE 1, there is shown a servomotor comprising a forward shell 10 and a rear shell 12 joined together by a twist lock connection, as at 14, with a bead 16 of a flexible wall 18 interposed to seal the connection of the shells. The flexible wall also includes an inner bead 20 which is snap fitted into a recess of a plastic wall 22 that includes a forward boss 24 and a rearward boss 26. The forward boss 24 is hollow to receive a deformable reaction disc 28 and a head 30 of a force transmitting rod 32. The force transmitting rod 32 projects from the front shell 10 through a seal 34 for actuation of a master cylinder (not shown) or analogous force generating means that is operated by the servomotor. A return spring 36 is assembled between the forward shell 10 and the wall 22 in order to maintain the released position of the movable wall in the servomotor, as shown in FIGURE 1.

The rear boss 26 extends exteriorly of the servomotor through an opening in the rear shell 12 which is provided with a bearing seal assembly 37. This boss is hollow and is opened by means of a passage 38 to chamber 40 in front of the movable wall and by means of a passage 42 to a rear chamber 44 on the rear side of the movable wall comprised of the wall 22 and the flexible wall 18. As seen, the hollow boss 26 opens into the hollow portion of the boss 24 centrally of the wall 22 and is formed as a stepped bore, so-to-speak, where the forward portions guide a reaction plunger 46 that is formed to have a rearwardly facing valve seat 48 and a spherical socket for receipt of a ball end 50 of a push rod 52. This stepped bore within the boss 26 is provided with an annular valve seat 54 adjacent the inlet of the passage 38 within the boss 26 and with a shoulder 56 immediately therebehind. A flexible poppet valve 58 is then assembled within the boss 26 by means of inserting it within the boss until its mounting flange 60 contacts the shoulder 56.

Preferably the reaction plunger 46, the flexible poppet 58 and the push rod 52 are inserted within the boss 26 as a subassembly; i.e., the reaction plunger 46 is assembled to the ball end of the push rod 52 by swaging after the flexible poppet valve 58 is fitted thereover with a valve follow-up spring 62 being assembled interiorly of the flexible poppet 58. A valve and spring retainer 64 is inserted under the valve mounting flange 60 to have its angularly, inwardly depending spring retainer flange 66 (see FIGURE 2) forming a bearing for the valve follow-up springs 62. Then a valve return spring is compressed between an upwardly turned flange 68 having a trailing ring 70 and a collar 72, which may be a snap ring inserted in a groove of a push rod 52 to complete the preassembly of the plunger 46, valve 58 and push rod 52.

Then upon assembly within the boss 26 a key 74 is inserted from the recess that later receives the bead 20 of the flexible wall 18 to unite the valve assembly to the movable wall comprising of the wall 22 and the flexible wall 18.

After this valve assembly has taken place, a filter 76 is inserted in the open end of the boss 26 about the push rod 52, and a rubber boot 78 having openings 80 for atmospheric communication interiorly thereof and which may still further include another filter 82 is assembled to the rear shell 12 and to the push rod 52 to complete the servomotor construction.

It should be noted that the trailing ring 70 of the valve and spring retainer 64 serves to guide the assembly interiorly of the boss 26 and the annular body of the valve and spring retainer 64 is normally sized to expand the annular profile of the valve mounting flange 60 so as to ensure a sealing fit with the boss 26 at its shoulder 56.

As may be appreciated by those skilled in the art, the flexible poppet valve also includes a valve flange 84 that is connected to the valve mounting flange 60 by a diaphragm intermediate section 86. In addition, it is desirable to form with the valve flange 84 a reinforcing ring 87 upon which the valve follow-up spring 62 may bear.

One distinct advantage of the valve and spring retainer design as taught by this invention is the fact that the angularly, inwardly depending flange 66 will permit the curling inwardly of the diaphragm portion 86 of the flexible poppet valve 58 upon insertion into the movable wall so that it will not interfere with the proper location of the valve mounting flange 60.

Operation

In operation, the operator of the servomotor will actuate a means to reciprocate the push rod 52 inwardly with respect to the servomotor whereby the reaction plunger 46 will move toward the deformable disc 28. This will permit the valve follow-up spring 62 to force the valve flange 84 to abut the seat 54, as seen in FIGURE 2. Further inward reciprocation of the push rod 52 will then separate the valve seat 48 of the reaction plunger 46 from the valve flange 84 and permit atmospheric air entering via the filtering means to exit through the poppet valve 58 to the passageway 42 and thereby enter the control chamber 44 for actuation of the movable wall of the servomotor. It should be noted, that in order to create a pressure differential across the servomotor, a check valve 88 is connected by means of a grommet connection 90 to the front shell 10. This check valve is communicated by a conduit (not shown) to the engine intake manifold of an automobile or similar vacuum creating means to provide vacuum in the chamber 40 at all times. Thus, in the released position shown in FIGURE 1, this vacuum also exists in the control chamber 44 due to the fact that the valve flange 84 is held off of the seat 54 by the action of the valve return spring 92 being stronger than the valve follow-up spring 62. Furthermore, the vacuum communication via passage 38 from chamber 40 to 44 is closed upon the inward reciprocation of the push rod 52, as aforementioned whereby after the lapping of the valve flange 84 on the seat 54 and the removal of the seat 48 therefrom atmospheric pressure is introduced to the chamber 44 to provide the necessary pressure differential across the movable wall for the operation thereof.

Upon removal of seat 48 from the valve flange 84 the reaction plunger will begin to progressively receive the extrusion of the deformable disc 28 to provide "feel" to the operator.

Having set forth a preferred construction for the utilization of our invention it is now desired to set forth the intended scope of protection sought by these Letters Patent as follows:

1. In a servomotor having a fluid pressure actuated movable wall, a valve means for controlling the fluid pressure on opposite sides of the movable wall, which valve means comprises:
   a valve housing means having passage means communicating with each side of said wall and having a valve seat between a passage to one side of said wall and a passage to another side of said wall, said valve housing means also having a communication to a fluid pressure power source via an axial bore which is provided with a shoulder spaced from said valve seat;
   an operator-operated valve seat means within said housing means and supported thereby to be relatively movable with respect to said valve housing means;
   an annular, flexible poppet valve having a valve flange connected to a mounting flange;
   a retainer housing said mounting flange on said shoulder of said bore, said retainer having an upwardly turned flange connected by an annular body to an angularly depending flange;
   a first spring between said valve flange and said angularly depending flange to cause said valve flange to be biased towards said valve seat of said housing means; and
   a second spring between said valve seat means and said upwardly turned flange to normally maintain said valve seat means on said valve flange and bias said valve flange away from said valve seat of said housing means.

2. The structure as set forth in claim 1 and further comprising a reinforcing ring in said valve flange upon which said first spring bears.

3. The structure as set forth in claim 1 wherein said annular body of said retainer underlies said mounting flange to compress it between said housing means and said annular body when said mounting flange is abutting said shoulder.

4. A valve assembly for a fluid pressure servomotor comprising:
   a flexible poppet valve having a valve flange and a mounting flange connected by a diaphragm;
   a retainer for said poppet valve, said retainer having an upwardly projecting portion for in abutting relationship with the mounting flange, an axial portion underlying the mounting flange and an inwardly depending portion formed at an angle with respect to said axial portion to project under said axial portion;
   a movable valve seat operatively arranged in front of said valve flange;
   a push rod means operatively connected to said movable valve seat;
   a first spring between said inwardly depending portion and said valve flange to normally extend said diaphragm; and
   a second spring between said upwardly projecting portion of said retainer and said push rod means to abut said valve seat on said valve flange compressing said valve flange towards said mounting flange with said diaphragm folding inwardly thereby precluding its bulging interference with surrounding structure.

5. A valve assembly according to claim 4 wherein the surrounding structure is a tubular boss of a movable wall within the servomotor which tubular boss has a shoulder against which the poppet valve mounting flange is urged by said second spring acting on said upwardly projecting portion of said retainer.

6. A valve assembly according to claim 5 wherein said upwardly projecting portion of said retainer terminates in an annular section sized to slidably guide said valve assembly centrally of said boss and thereby ensure seating of said mounting flange all around said shoulder.

References Cited

UNITED STATES PATENTS

| | | | |
|---|---|---|---|
| 3,125,003 | 3/1964 | Hoekstra | 92—96 |
| 3,152,449 | 10/1964 | Schultz | 91—369 |
| 3,312,147 | 4/1967 | Reichard | 91—376 |

PAUL E. MASLOUSKY, *Primary Examiner.*

U.S. Cl. X.R.

91—369; 92—99; 137—596.2, 627.5